United States Patent [19]

Dauth

[11] 4,124,317
[45] Nov. 7, 1978

[54] COUPLING MEANS

[75] Inventor: Michael F. Dauth, Montreal, Canada

[73] Assignee: Metalworks Limited, Lachine, Canada

[21] Appl. No.: 724,555

[22] Filed: Sep. 20, 1976

[51] Int. Cl.² .............................................. F16B 9/00
[52] U.S. Cl. ...................................... 403/8; 403/254; 403/264
[58] Field of Search ............... 403/252, 253, 254, 255, 403/187, 201, 230, 7, 8, 43–48, 264; 5/296, 298

[56] References Cited

U.S. PATENT DOCUMENTS

| 350,768 | 10/1886 | Pettengill | 403/48 X |
| 721,292 | 2/1903 | Forster | 5/298 UX |
| 790,027 | 5/1905 | Brodt | 403/8 |
| 3,580,620 | 5/1971 | Offenbroich | 403/264 X |
| 3,915,579 | 10/1975 | Offenbroich | 403/264 |

FOREIGN PATENT DOCUMENTS

| 509,547 | 8/1920 | France | 5/298 |
| 1,564,531 | 3/1969 | France | 403/255 |
| 17,803 | 11/1898 | Switzerland | 5/298 |

Primary Examiner—Andrew V. Kundrat
Attorney, Agent, or Firm—Charles E. Brown

[57] ABSTRACT

The invention relates to means for coupling a first rigid element to a second rigid element, the coupling means including a wheel having a central circular opening therein with a screw thread on the inner surface of the central opening and a rod member including a longitudinal rod having a screw thread on the outer surface thereof. The wheel screw thread and the rod screw thread are mating threads. The wheel is received in a transverse passage extending through the width of the first rigid element in a plane at right angles to the length of the first element and the rod is received in a longitudinal passage in the first element, the passage extending from one edge of the first element into the element and being in communication with the transverse passage. The longitudinal passage is also aligned with a central opening when the wheel is received in the transverse passage, whereby the rod can extend, at one end thereof, through the longitudinal passage into the central opening so that the rod screw threads can matingly engage the screw threads of the inner surface. Engagement means, such as lugs, are disposed at the other end of the rod for couplingly engaging openings in the second rigid element.

1 Claim, 12 Drawing Figures

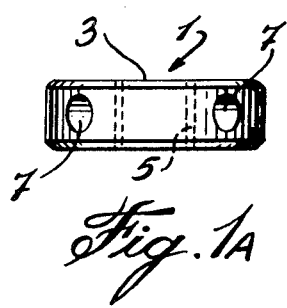
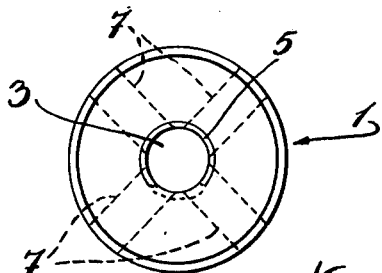
Fig. 1A
Fig. 1B
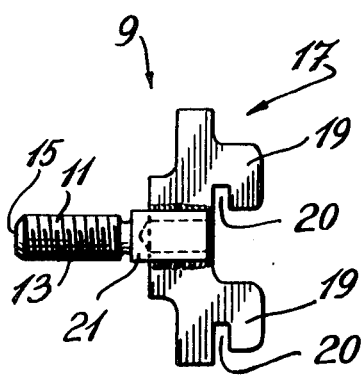
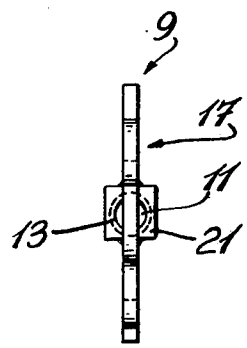
Fig. 2A
Fig. 2B
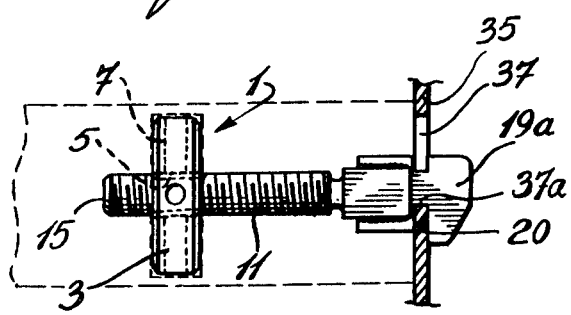
Fig. 3

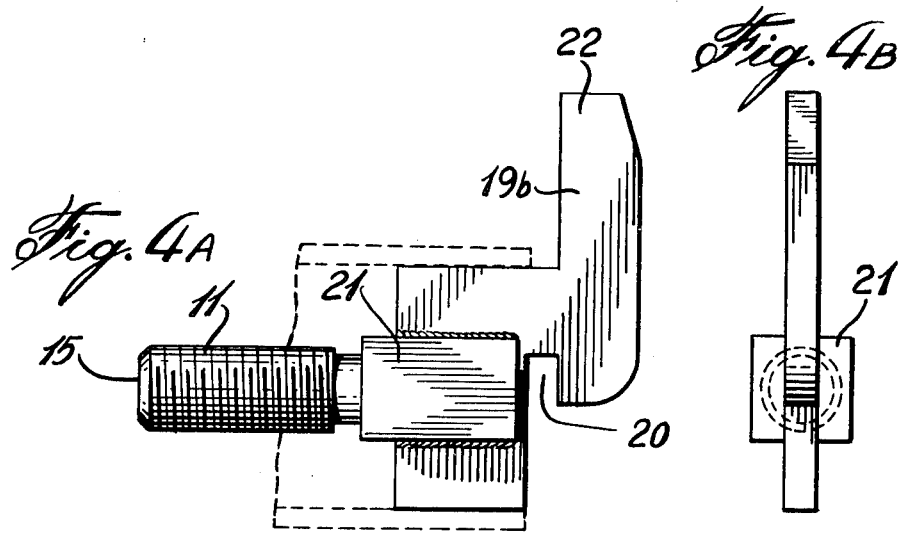
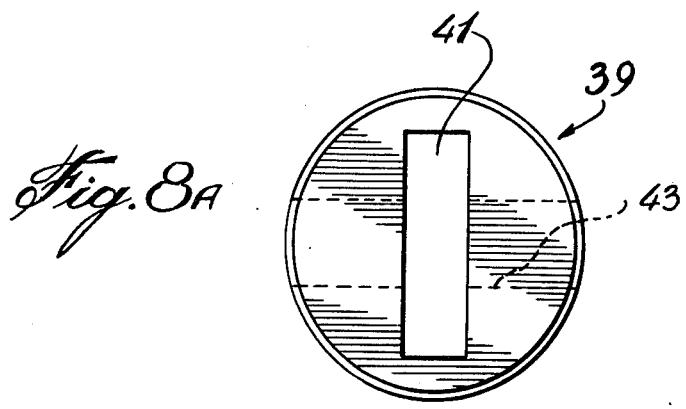
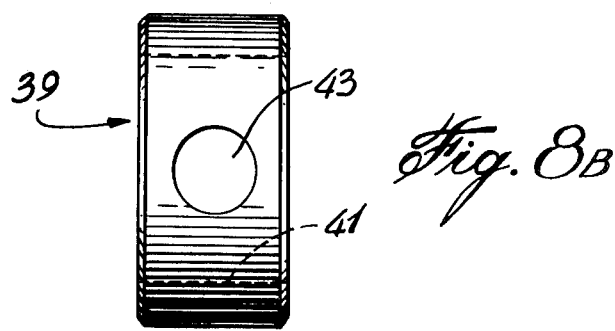

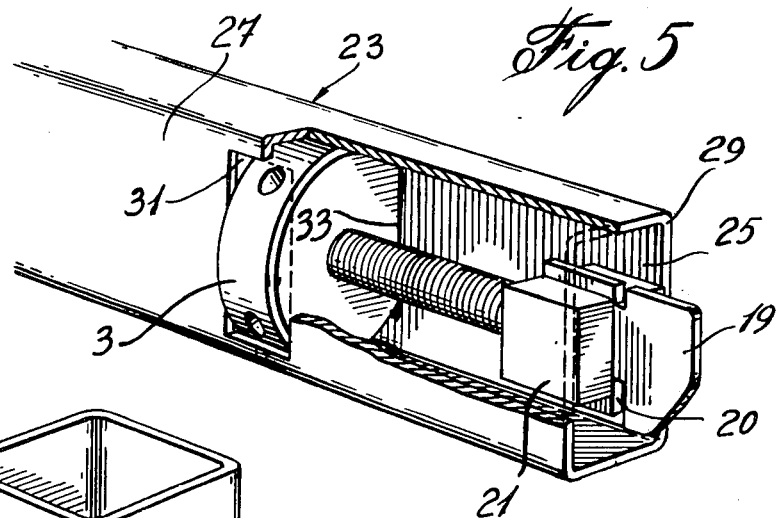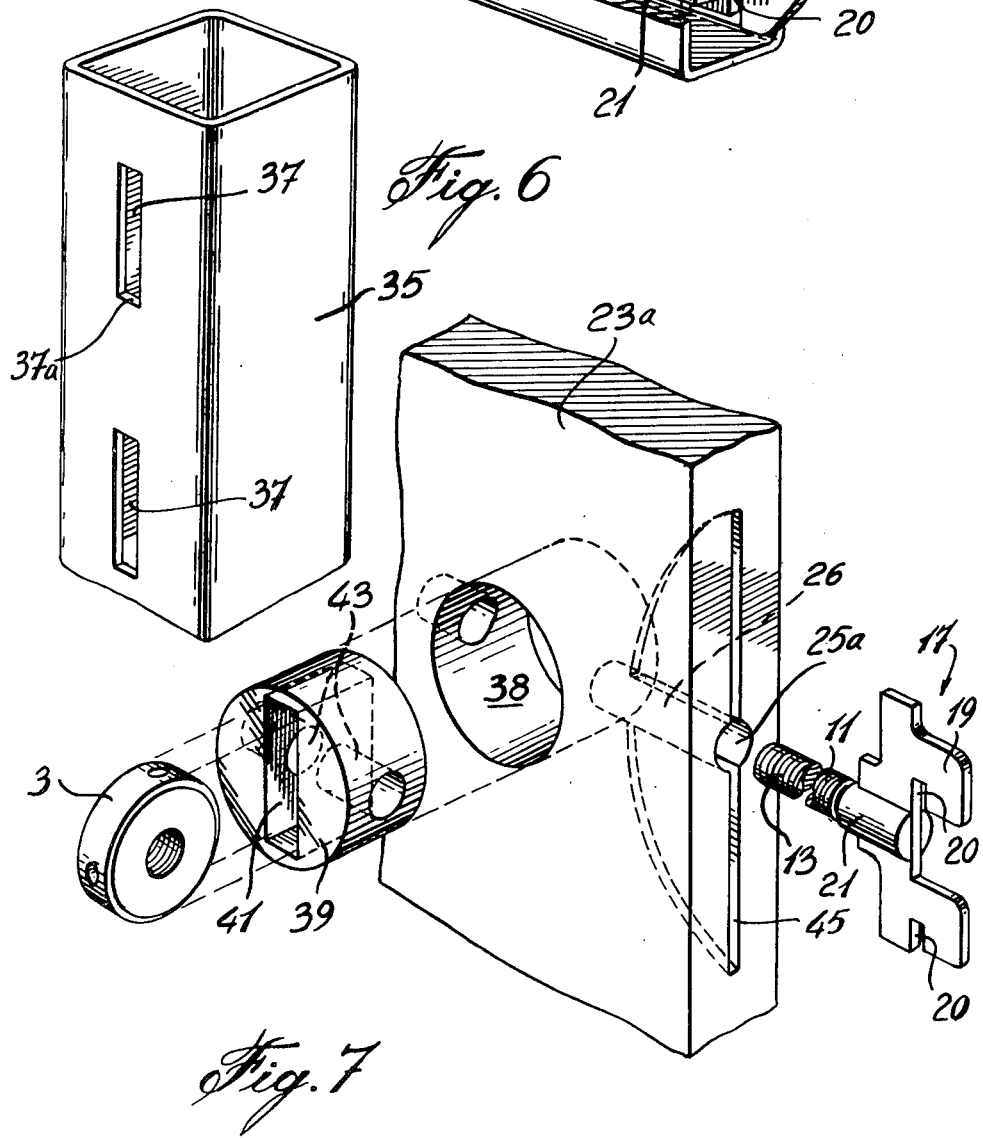

COUPLING MEANS

BACKGROUND OF THE INVENTION

1. Field of the Invention

The invention relates to coupling means for coupling one rigid element to one or more other rigid elements. More specifically, the invention relates to such a coupling means which is mountable in the one element, and movable into and out of the element, and including engagement means for couplingly engaging openings on the other elements.

2. Statement of the Prior Art

Means for coupling one element to another are known in the art as exemplified in U.S. Pat. Nos. 2,930,638; 3,811,785; 3,747,965; 3,580,620; 3,315,996 and 2,719,750.

However, none of the above described means are conceptually or structurally similar to the means taught and claimed herein.

SUMMARY OF THE INVENTION

In accordance with the invention, coupling means comprise a wheel having a central circular opening therein, a screw thread on the inner surface of said central opening, a rod member comprising a longitudinal rod having a screw thread on the outer surface thereof, the wheel screw thread and the rod screw thread comprising mating threads, one end of said rod being insertable into said central opening whereby the screw threads of the rod and wheel are in engagement and the rod is movable relative to the wheel, when the wheel is rotated, by action of the rod and wheel screw threads upon each other, and engagement means disposed at the other end of said rod.

The engagement means preferably comprises one or a plurality of lugs.

From another aspect, means for coupling a first rigid element to a second rigid element comprise a wheel having a central circular opening therein, a screw thread on the inner surface of said central opening, a rod member comprising a longitudinal rod having a screw thread on the outer surface thereof, the wheel screw thread and the rod screw thread comprising mating threads, said wheel being received in a transverse passage extending through the width of said first rigid element in a plane at right angles to the length of the first element, said rod being received by a longitudinal passage in said first element, said longitudinal passage extending from one edge of said first element into said element and being in communication with said transverse passage, said longitudinal passage being aligned with said central opening when said wheel is received in said transverse passage, whereby the rod can extend, at one end thereof, through said longitudinal passage into said central opening so that the rod screw threads can matingly engage the screw threads of said inner surface, and engagement means disposed at the other end of said rod for couplingly engaging openings in the second rigid element.

In one embodiment, the first element comprises a tubular member and the transverse passage is defined by aligned openings in the sidewalls of said tubular member, said wheel being received in said transverse passage such that said central opening is disposed centrally of the width of said tubular member.

In a second embodiment, the first element comprises a solid rectangular wooden prism, said transverse passage comprising a bore extending through the width of said prism, and coupling means includes a plug member having a transverse slot extending through the width thereof, and a longitudinal passage at right angles to said slot, said bore receiving said plug member, said slot receiving said wheel, said longitudinal passage of said plug member being aligned with said central opening when said wheel is disposed in said slot of said plug member, said longitudinal passage of said first element comprising a cylindrical-like passage communicating with said bore, said longitudinal passage of said plug member being aligned with said longitudinal passage of said first element when said plug member is in said bore, whereby the longitudinal passage of said first element communicates with said central opening.

BRIEF DESCRIPTION OF THE DRAWINGS

The invention will be better understood by consideration of the following description, taken together with the accompanying drawings, in which:

FIGS. 1A and 1B illustrate the wheel member of the inventive coupling means;

FIGS. 2A and 2B illustrate one embodiment of the rod member of the inventive coupling means;

FIG. 3 shows an assembled coupling means in accordance with the invention;

FIGS. 4A and 4B illustrate a second embodiment of the rod member;

FIG. 5 shows the coupling means mounted in a tubular element;

FIG. 6 shows one embodiment of a second element;

FIG. 7 shows the coupling means mounted in a wooden block element; and

FIGS. 8A and 8B show a plug insert for the embodiment of FIG. 7.

DETAILED DESCRIPTION OF THE DRAWINGS

Referring now to the drawings, FIG. 1A is a top plan view of the wheel member of the inventive coupling means, and FIG. 1B is a side view thereof. The wheel, indicated generally at 1, comprises a central circular opening 3 having a screw thread 5 on the interior surface thereof. The wheel also includes a plurality of openings 7 in the top surface thereof for receiving a tightening tool as will be described below.

FIG. 2A is a side view of a rod member, indicated generally at 9, for the coupling means, and FIG. 2B is a front view thereof. The rod member includes a longitudinal rod 11 having a screw thread 13 extending along the surface thereof. The diameter and pitch of screw thread 13 is designed to match with the diameter and pitch of screw thread 5, so that 5 and 13 are mating screw threads. One end 15 of the rod 11 is adapted to be inserted into the opening 3 of the wheel member 1.

Disposed at the other end of the rod 13 are engagement means, shown generally at 17, for engaging openings in an element to be coupled. In the embodiment shown in FIGS. 2A and 2B, the engagement means comprises two lugs 19, with engagement notches 20, mounted on a mounting block 21. As can be seen in FIG. 2B, the cross-section of 21 is square, for reasons which will be discussed below.

Other embodiments of the engaging means are shown in FIG. 3 (a single lug) and FIGS. 4A and 4B (a two ended lug having a long end 22) and other similar variations are, of course, within the scope of the invention. In particular, the mounting block could be, for example, circular in cross-section for use in the embodiment shown in FIG. 7.

An assembled coupling means is shown in FIG. 3 of the drawings. As can be seen, the end 15 of the rod is inserted in and through the opening 3 of the wheel. Threads 5 matingly engage threads 13 so that rotation of the wheel 1 will cause the rod 11 to move relative to the wheel 1.

The coupling means is mounted in one of two elements to be coupled, and one embodiment of a coupling means mounted in an element is shown in FIG. 5. Referring to FIG. 5, the one element comprises a tubular member indicated generally at 23. The tubular member, of course, includes a longitudinal passage 25 which extends from one edge of the member and into and through the member. The member also includes opposing side walls 27 and 29, and aligned openings 31 and 33, which define a transverse passage 32, are included in 27 and 29 respectively. Wheel 1 is disposed in the passage 32 and extends through the width of the member 23 in a plane at right angles to the length of the member. As can be seen, the passage 25 is in communication with the passage 32.

Preferably, one of the openings 31 or 33 (33 in FIG. 5) is made of such a size that it will act as a stop means for the wheel 1 and locate the wheel so that the central opening therein is disposed centrally of the width of the member 23. The other opening (31 in FIG. 5) is longer than the first opening as the wheel will not pass through the first opening. In relative terms, the short opening has a length less than the diameter of the wheel and the long opening has a length greater than the diameter of the wheel. When the wheel is received in passage 25, passage 32 is aligned with opening 3.

The rod member is then inserted into the passage 25 from the edge of the member 23 so that end 15 of the rod extends into and through central opening 3 of the wheel 1, whereupon screw thread 5 matingly engages screw thread 13. The rod is long enough so that the engagement means at the other end of the rod can extend out of the passage 25.

With the coupling member so disposed, when wheel 1 is rotated, and by the action of screw threads 5 and 13 one on the other, the engagement means will move relative to the front end of the tubular member. With the tubular element, the mounting block with a rectangular cross-section is used to prevent rotation of the engagement means when the wheel is rotated. In one embodiment, the dimensions of the arrangement are such that it is possible to draw the engagement means completely within the tubular element into passage 25 so that the front end of the engagement means is behind the extreme right hand edge of the member 23.

The coupling means will couple an element in which it is mounted to a second element such as element 35 in FIG. 6. The second element will have one or more openings 37 extending through one side of the element. In FIG. 6, the openings are rectangular slots to fit the lug-type engagement means disclosed herein. It will be appreciated that if different shapes and types or forms of engagement means are used, then the shapes and forms of the openings will be correspondingly different than the shape and form illustrated herein.

To couple the element 23 to element 35, the wheel 1 on 23 is rotated to move the engagement means outwardly until the notch 20 of the lug 19 is completely outside the tubular member. The lug 19 is then inserted into slot 37 until the notch 20 is disposed over the side 37a of the slot. The lug is then pushed down so that side 37a moves into the notch 20 and the lug is in holding engagement with the element 35.

The wheel 1 is then rotated to move the engagement means inwardly until the front edge of 23 is flush with the adjacent surface of element 35. In order to provide a more rigid coupling, a tightening tool, such as an elongated cylinder, is inserted in one of the openings 7 in the wheel 1, to provide a levered force for tightening the wheel. With the inventive coupling means, a rigid coupling is provided between the two elements.

When the engagement means comprises two lugs, each of the lugs is inserted into a different slot 37. The two ended lug shown in FIGS. 4A and 4B will provide greater support for heavier loads. To insert this lug into the slot, the member 23 is brought to the element 35 at an angle to 35 with the long end 22 leading and pointing in an upward direction. The top edge of the long end is inserted in the slot first, and the element 23 is rotated downwardly until it is at right angles to the front surface of 35. As element 23 is rotated, the remainder of 22 will move into the slot, as will the short lug, until notch 20 will be disposed over the edge 37a. For the remainder, the procedure is identical to the procedure described above.

The retractability feature is especially useful when an element, having coupling means at both ends thereof, is to be coupled between and to two posts, having receiving slots therein for receiving the lugs of the coupling means, and being spaced apart by a fixed distance. Thus, if the posts are spaced three feet apart, then the element must be exactly three feet long to completely fill the space between the posts. If the lugs extend beyond the outer edges of the element, then the total length of the element and the lugs would be greater than three feet, so that this element could not be fitted into the three foot space between the posts.

With the retractable coupling means, the coupling means would be drawn completely into the element in which it is mounted. The element would be disposed in the space between the posts and moved until the lugs of the coupling means are adjacent the respective ones of the slots of the posts. The wheels would then be rotated to move the lugs outwardly, so that the lugs move into their respective slots, and the procedure above-described would then be followed to complete the coupling.

In the above described embodiments, the coupling means is mounted in a tubular element. However, the coupling means can also be mounted in a solid block, such as a solid block of wood in the shape of a rectangular prism, as illustrated in FIG. 7 hereof. In FIG. 7, a cylindrical-like passage 25a extends into the block from an edge thereof. The passage 25a receives the rod 11 of the coupling means and is slightly greater in diameter than the diameter of the rod.

A wheel receiving passage, such as bore 38, extends completely through the block and receives a plug 39 therein. As can be seen in FIGS. 8A and 8B, the plug includes a transverse slot 41, in which the wheel is disposed in a plane at right angles to the plane of the plug, and a longitudinal passage 43, which is circular in cross-section and extends through the entire plug. When the wheel is inserted in the plug, the passage 43 is aligned with the central opening in the wheel, and when the plug is installed in the block, the passage 43 is aligned with the passage 25a. Thus, the passage 25a is aligned with the central opening of the wheel.

To mount the coupling means in the block, the wheel and plug are first installed in the block with passages aligned as above-described. The rod is then inserted in the passage 25a until the threads 13 on the rod engage the threads 5 in the wheel. To couple 23a to a second element, the same procedure as above-described is employed.

A slotted opening 45 may be included to permit complete retraction of the engagement means into block 23a.

Although several embodiments have been described, this was for the purpose of illustrating, but not limiting, the invention. Various modifications, which will come readily to the mind of one skilled in the art, are within the scope of the invention as defined in the appended claims.

I claim:

1. A coupling between an end of a tubular member and a face of a support element, said coupling comprising an open-ended hollow tubular member of a rectangular cross section and including first side walls connected together by second side walls, a wheel having a central circular opening therein, a screw thread on the inner surface of said central opening, a rod member comprising a longitudinal rod having a screw thread on the outer surface thereof, the wheel screw thread and the rod screw thread comprising mating threads, said first side walls having formed therein passages aligned transversely of said tubular member, said passages each being generally rectangular in outline and of a width generally equal to the thickness of said wheel and said first side walls being spaced apart a distance less than the diameter of said wheel with said wheel being mounted within said tubular member for rotation while being substantially fixed against movement longitudinally of said tubular member, said wheel extending outwardly beyond said first side walls for ease of manipulation and being generally supported by said second side walls, said rod being threaded into said wheel and extending longitudinally through said tubular member towards said open end, said support element face having an opening therethrough, a lug carried by said rod extending through said opening and interlocking behind said face, said rod being tensioned by said wheel between said wheel and said lug to force the open end of said tubular member against said face, and transverse guide means supporting said lug on the end of said rod and extending laterally from opposite sides of said lug to said first side walls transversely positioning said tubular member relative to said face, and said guide means having and end face spaced from the interlocking portion of said lug a distance substantially equal to the thickness of said support face opening.

* * * * *